Aug. 21, 1962    O. E. LEWIS    3,050,167
VARIABLE SPEED AND TORQUE TRANSMITTING FLUID CLUTCHES
Filed May 22, 1959    2 Sheets-Sheet 1
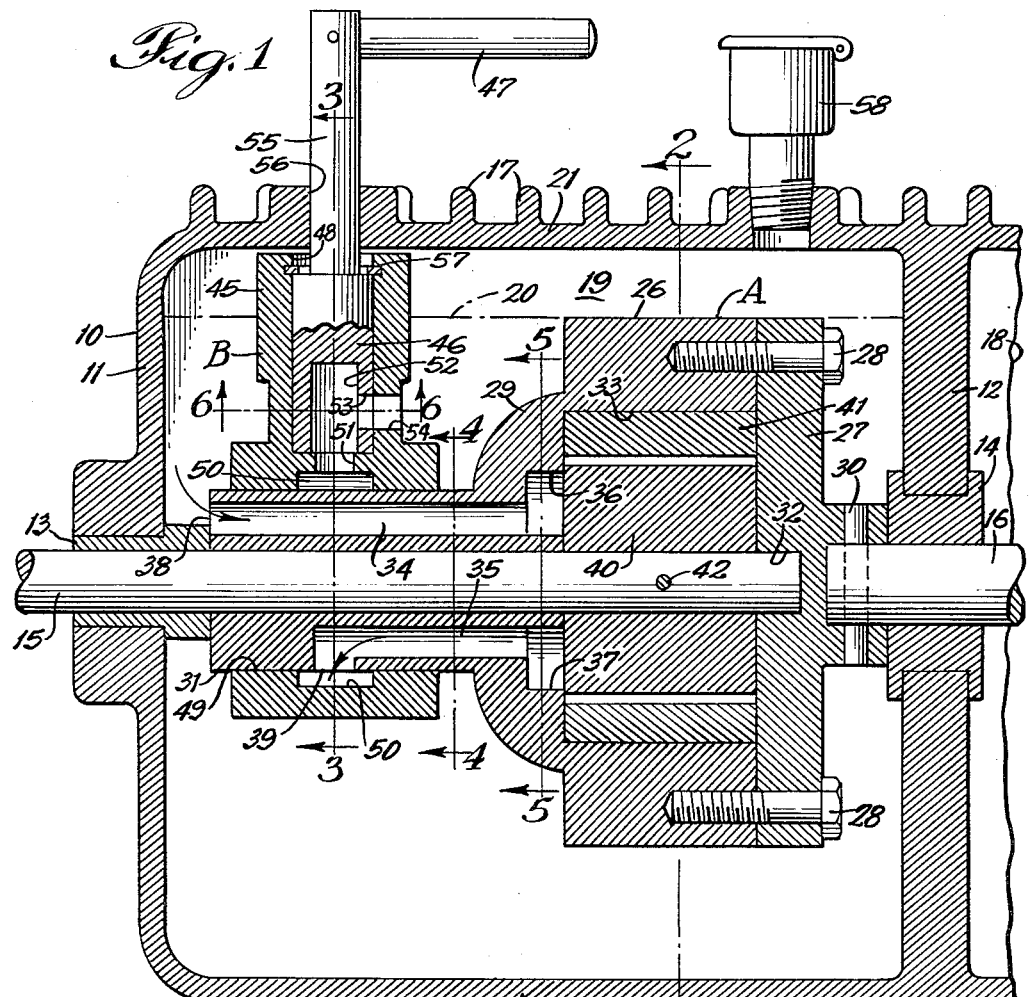
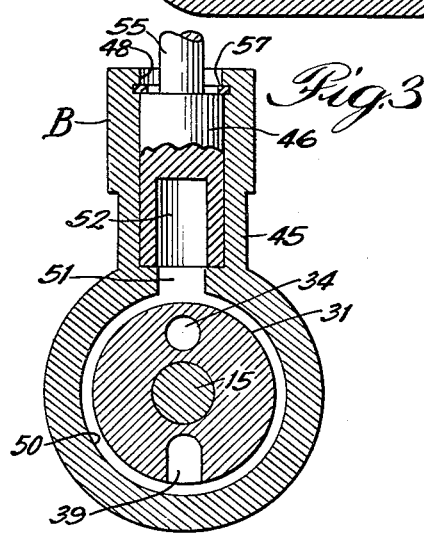
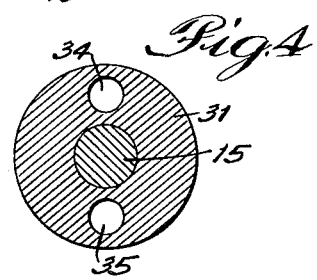
INVENTOR:
Orrin E. Lewis,
BY Frank Schraeder
ATTORNEY.

Aug. 21, 1962 O. E. LEWIS 3,050,167
VARIABLE SPEED AND TORQUE TRANSMITTING FLUID CLUTCHES
Filed May 22, 1959 2 Sheets-Sheet 2

INVENTOR:
Orrin E. Lewis,
BY Frank J. Schraeder Jr.
ATTORNEY.

United States Patent Office 3,050,167
Patented Aug. 21, 1962

3,050,167
VARIABLE SPEED AND TORQUE TRANSMITTING FLUID CLUTCHES
Orrin E. Lewis, Belleville, Kans., assignor to Speed Flow, Inc., Wichita, Kans., a corporation of Kansas
Filed May 22, 1959, Ser. No. 815,023
2 Claims. (Cl. 192—61)

This invention relates to a variable speed and torque transmitting fluid clutch.

One of the principal objects of the present invention is to provide an improved variable speed transmission which is extremely compact in construction and which has only a relatively small number of working parts. Another object is to provide a self-contained hydraulic transmission in which all of the power-transmitting and fluid-regulating elements are disposed within a single stationary or fixed housing containing a quantiy of oil or other suitable fluid.

A further object is to provide a fluid clutch which utilizes a gerotor gear pump assembly interposed between the input and output shafts for transmitting driving forces to the latter, the clutch including means located within the transmission housing for regulating the flow of fluid through the pump and thereby controlling the speed and torque of the output shaft. In this connection, it is a specific object to provide a pump having a fluid discharge passage parallel with and adjacent to a portion of the input shaft, the discharge passage communicating with flow control means extending about the input shaft within the housing. A still further object is to provide a fluid pumping mechanism having an intake passage also extending parallel with and adjacent to the input shaft and having a continuously open intake opening immersed within the body of the fluid contained within the transmission housing.

Other objects will appear from the specification and drawings in which:

FIGURE 1 is a broken longitudinal and vertical sectional view of a variable speed hydraulic transmission embodying the present invention;

FIGURE 3 is a broken vertical sectional view taken along line 3—3 of FIGURE 1;

FIGURE 4 is a cross section of the structure shown in FIGURE 1 along line 4—4;

Figure 2:
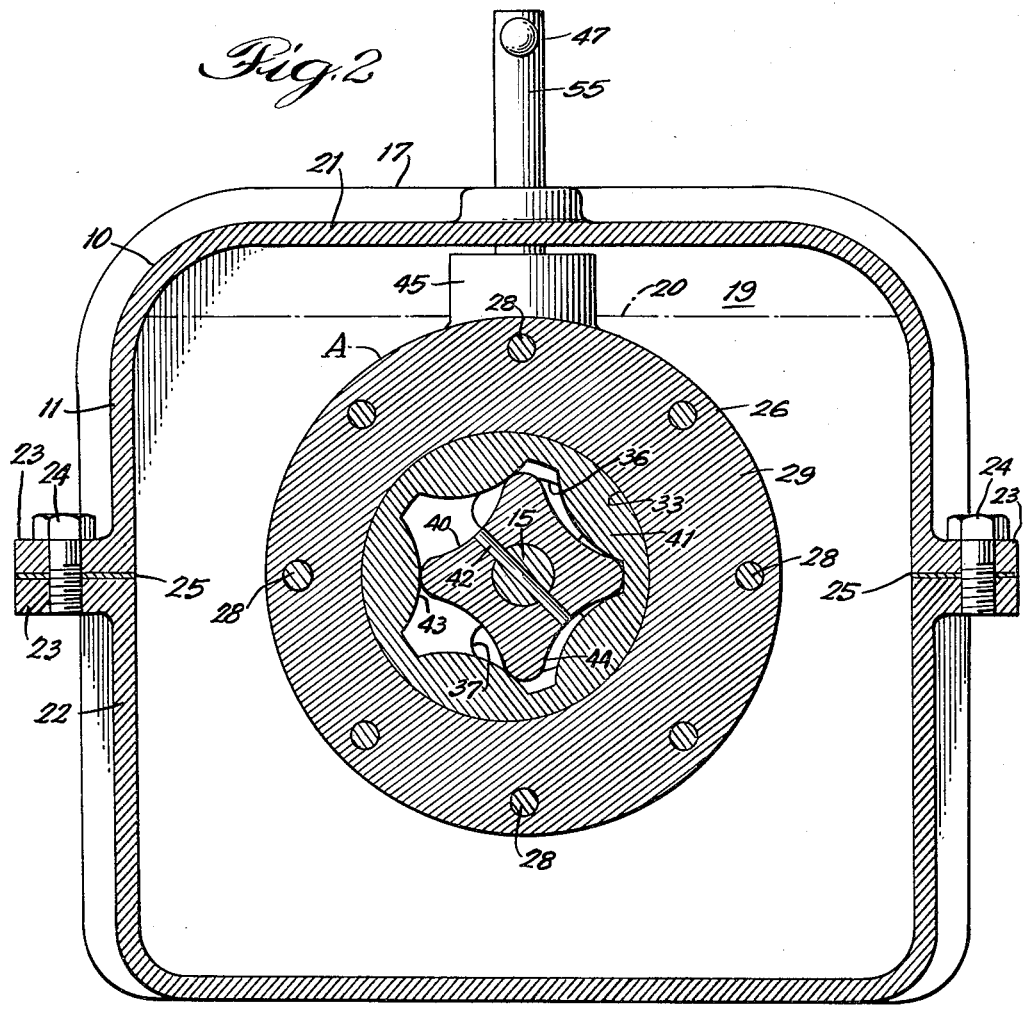
FIGURE 2 is a vertical cross-sectional view taken along line 2—2 of FIGURE 1.

In the embodiment of the variable speed transmission illustrated in the drawings, the numeral 10 generally designates a transmission housing having end walls 11 and 12 respectively provided with bearing inserts 13 and 14 which rotatably receive input and output shafts 15 and 16. The housing is preferably equipped with spaced transversely-extending cooling fins or ribs 17 and, if desired, the walls of the housing may extend longitudinally beyond end wall 12 to provide an additional chamber for containing further structure such as, for example, a reversing mechanism (not shown). Since such a mechanism forms no part of the present invention, the structure shown in FIGURE 1 is broken away along line 18 for the purpose of simplifying the present disclosure.

Housing 10 is provided with a chamber 19 which not only contains all of the working parts of the transmission but which also serves as a reservoir which is at least partially filled with oil or other suitable fluid required for the operation of the transmission. In FIGURES 1 and 2, the oil level is represented by broken line 20 although, as will be understood more clearly from the subsequent description, considerable variation in the level of the oil within the chamber may be tolerated without adversely affecting the operation of the transmission. The housing is composed of a pair of upper and lower shells 21 and 22, each equipped with lateral flanges 23 and adapted to be connected together by screws 24. A resilient gasket 25 interposed between the flanges of the respective shells or housing sections insures a liquid-tight seal between the connected parts.

Within the chamber of the transmission housing is a pump, generally designated by the letter A, and a fluid flow control valve instrumentality generally represented by the letter B. The pump comprises a pump body 26 which includes a circular end plate 27 connected by a circumferentially spaced series of screws or bolts 28 to a cup-shaped body member 29. The circular end plate 27 is coaxial with the aligned input and output shafts 15 and 16 and is securely fixed to the rotatable output shaft by means of a pin 30. Thus, the entire pump body 26 is locked against independent rotation with respect to output shaft 16.

As shown most clearly in FIGURES 1, 3 and 4, the body member 29 of the pump is provided with an axially-extending sleeve portion 31 of reduced diameter. This cylindrical sleeve portion is centrally bored for rotatably receiving an extended portion of input shaft 15. Referring specifically to FIGURE 1, it will be seen that the input shaft extends through the entire pump member 29 and has its end portion rotatably received within a central socket or recess 32 in the inner face of end plate 27.

Figures 5, 6, 7:
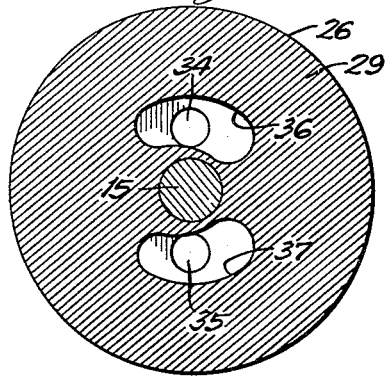
FIGURE 5 is a cross-sectional view taken along line 5—5 of FIGURE 1 and showing the fluid intake and discharge passages of the pump structure.
FIGURE 6 is a horizontal sectional view of the adjustable control valve, the view being taken along line 6—6 of FIGURE 1.
FIGURE 7 is a horizontal sectional view similar to FIGURE 6 but showing the valve in closed condition.

Within the pump body is a cylindrical chamber or cavity 33 which, as shown in FIGURE 2, is eccentrically disposed with respect to input shaft 15 and with reference to the rotational axis of the pump body itself. Cavity 33 communicates directly with intake and discharge passages 34 and 35 extending longitudinally in the sleeve portion 31 of the pump body. As shown in FIGURES 1 and 5, these passages 34 and 35 are enlarged adjacent cavity 33 to provide a pair of generally diametrically-opposed crescent-shaped recesses 36 and 37. The intake passage 34 preferably extends the entire length of sleeve portion 31 and terminates at its inlet end with an intake opening 38. The discharge passage 35, on the other hand, does not extend the entire length of the sleeve portion but instead turns outwardly and terminates intermediate the longitudinal limits of the sleeve portion in a peripheral discharge opening 39.

Within the cavity 33 of the pump body is a gerotor gear assembly which, upon rotation of input shaft 15, circulates oil or other suitable fluid through body 26. The gerotor gear assembly consists essentially of an inner gerotor or star gear 40 and an outer gerotor or ring gear 41. The inner gear is secured to input shaft 15 by pin 42 and is located within the space defined by the outer gear 41. As shown in FIGURE 2, each of the gerotor gears has tooth-like projections 43 and 44, respectively, which intermesh with one another, the outer gerotor gear 41 having one more tooth or projection 43 than the number of teeth 44 of the inner gerotor gear. It will also be noted that the outer gear is eccentrically disposed for rotation within cavity 33 about an axis parallel with but laterally displaced from the axis of rotation of inner gear 40. Although the arrangement and design of the gerotor gears is such that their respective teeth are at all times in substantial engagement with one another, the eccentricity of the outer gear permits it to rotate at a slower rate than the inner gear with the result that variable volume chambers are provided between their respective teeth. Thus, as the teeth of the inner gear sweep in a counterclockwise direction (FIGURE 2) over the recess or mouth 36 of the intake passage, the space between such teeth and the adjacent teeth of the outer gear increases to produce a suction effect. At the same time, the spacing between the two gears decreases as the teeth of the inner gear approach the mouth 37 of discharge passage 35, thereby forcing the fluid from the pumping chamber and into the discharge passage.

The adjustable control valve B comprises a stationary valve casing or body 45, a valve member 46 mounted within the casing, and a handle 47 for selectively controlling the position of the valve member. As shown in FIGURE 1, the valve casing is disposed entirely within the chamber 19 of the transmission housing. The upper neck portion of the casing 45 has a vertical bore 48 which rotatably receives the cylindrical valve member 46. The lower portion of the casing has a horizontal cylindrical opening or bore 49 which extends about and which rotatably receives the sleeve portion 31 of the pump body. Within bore 49 is an annular channel or recess 50 which is in constant communication with the lateral discharge opening 39 of sleeve portion 31 and which in turn communicates with vertical bore 48 through vertical passage 51.

The cylindrical valve member 46 is rotatably received within the vertical bore 48 of the valve casing and has in its lower portion an axial cavity 52 which communicates with passage 51. A radial passage 53 extends from this cavity to the periphery of the valve member and is registerable with the discharge port 54 of the valve casing. Thus, when the valve member is in the position illustrated in FIGURES 1 and 6, fluid may flow from the pumping cavity of the outer gerotor gear 41 through discharge passage 35, discharge or outlet opening 39, annular recess 50, cavity 52 and discharge port 54. However, when the valve member is rotated so that passage 53 is no longer in register with discharge port 54 (FIGURE 7), the circulation of fluid through the pump and valve is prevented. It is to be understood, of course, that the valve member may be rotated into a variety of partly open positions where passage 53 is partially, but not completely, in register with discharge port 54 and in which reduced amounts of fluid are discharged through the port.

Any suitable means may be provided for manually or automatically controlling the position of valve member 46. In the illustration given, I have provided the valve member with an upstanding extension 55 of reduced diameter which projects upwardly through opening 56 in the transmission housing. Handle 47 extends outwardly or radially from the extension for manual rotation of the valve member into open or closed positions, or into any selected intermediate position therebetween. Preferably, a ring 57, seated within an annular groove within the bore 48 of the valve casing, engages the shoulder of the valve member adjacent the lower end of extension 55 and prevents upward axial displacement of the valve member.

In FIGURE 1 it will be seen that a conventional oil fill cap or fitting 58 is threaded into an opening in the upper shell of the transmission housing so that additional amounts of oil or other suitable fluid may be introduced to maintain a selected oil level within the reservoir. It is to be noted, however, that it is not necessary to maintain a precise oil level within the housing for proper operation of the transmission. Preferably, the housing is only partially filled with oil to permit fluid expansion during operation of the apparatus. However, as long as the oil level is above the continuously open intake opening or port 38 at the end of sleeve 31, there will be a sufficient amount of fluid in the reservoir for operation of the variable speed transmission.

In the operation of the structure illustrated in the drawings, power from a suitable source is applied to input shaft 15 to rotate the inner gerotor gear within the pump body. With the valve B in the open condition illustrated in FIGURES 1 and 6, the eccentrically-mounted outer gerotor gear 41 is free to rotate within the pump body and the constantly changing chamber areas between the intermeshing gears which are exposed to the recesses 36 and 37 of the intake and discharge passages produces the desired pumping action. Thus, when the control valve is open, rotation of input shaft 15 and operation of gerotor gears 40 and 41 causes oil to be drawn into the continuously open intake port 38 and intake passage 34 where it then passes between the pumping gears in cavity 33 and is forced out of the pump through discharge passage 35 and finally through discharge port 54.

When the control valve is partially closed, then the circulation of oil through the pump A and control valve B is the same as already described except that the outer gerotor gear is restrained to a certain extent (depending upon the extent to which the valve has been closed) from rotating freely upon its eccentric axis. Assuming that the rotational speed of the input shaft remains substantially constant, then the outer gerotor gear must necessarily rotate to a certain extent about the axis of the input shaft and, since the outer gear is eccentrically mounted, such rotation of the eccentric gear produces a corresponding rotation of the entire pump body 26.

When the discharge control valve B is completely closed (FIGURE 7), the inner and outer gerotor gears are hydraulically interlocked. Since the outer gerotor gear is mounted eccentrically to the input and output shafts, the outer gear can no longer rotate independently of the pump body and a direct mechanical interlock between the pump body rotatably carried by the output shaft 16 and the gerotor gears operatively associated with the input shaft 15 is thereby formed. As a result, full power and speed is transmitted from the input shaft to the output shaft. Variable output power and speed is thus obtained by adjusting the discharge control valve to various positions for selectively varying or completely arresting the discharge flow of fluid through the pump.

It is to be noted that during operation of the transmission, all of the moving parts are wholly or at least partially immersed in the body of oil contained within the sealed transmission housing. Thus, the same oil used for controlling the action of the pump and the speed and torque of the output shaft is also used to lubricate and cool the moving elements of the apparatus. In this connection, it will be observed that rotation of the pump body, including sleeve 31, will tend to cause turbulence in the oil contained within the housing, thereby facilitating the exchange of heat between the fluid and the ribbed walls of the housing.

It is to be understood that the transmission housing 10 remains stationary during operation of the fluid clutch or, in the event of vehicular use, remains stationary or fixed relative to the machine to which it is attached. In other words, the housing is intended to remain in substantially the same position illustrated in the drawings, unlike other fluid clutches which require rotatably mounted casings for their operation.

While in the foregoing I have disclosed an embodiment of the present invention in considerable detail for purposes of illustration, it will be understood by those skilled in the art that many of these details may be varied considerably without departing from the spirit and scope of the invention.

I claim:

1. A variable speed hydraulic transmission comprising a stationary transmission housing containing a body of oil, rotatable and axially-aligned input and output shafts extending into said housing, a pump body secured to said output shaft and being at least partially immersed within the body of oil within said housing, said pump body defining a pumping chamber therein and having a cylindrical sleeve portion rotatably receiving said input shaft, said sleeve portion having oil intake and discharge passages communicating with said pumping chamber and extending within said sleeve portion in parallel relation to said input shaft, said intake and discharge passages each being spaced closer to the rotational axis of said sleeve than the radial distance between said axis and the outer limits of said pumping chamber, said intake passage having a continuously open oil intake port submerged in said body of oil and disposed at one end of said sleeve portion in close proximity to the rotational axis thereof, said discharge passage having a discharge opening in the side of said cylindrical sleeve intermediate the ends thereof, means within said pumping chamber for pumping oil therethrough and for coupling said input shaft and pump body for simultaneous rotation when the discharge of oil from said pumping chamber is restrained, and an adjustable control valve having a stationary valve casing entirely within said stationary transmission housing, said casing having a portion thereof extending about said sleeve portion and having an inner annular channel in constant communication with said oil discharge opening, said casing also having a fluid discharge port located radially outwardly from said sleeve portion in close proximity thereto and having oil passage means disposed between said discharge port and said annular channel, and a valve member rotatably mounted within said valve casing for selectively controlling the discharge of oil through said discharge port.

2. A variable speed and torque transmission comprising a stationary housing defining a reservoir for a body of transmission fluid, rotatable and axially-aligned input and output shafts extending into said housing, a pump body secured to said output shaft and disposed within said housing, said pump body defining a pumping chamber and having a sleeve portion rotatably receiving said input shaft, said sleeve portion having a fluid intake passage extending therethrough in parallel relation to said input shaft and communicating with said pumping chamber, said intake passage also having a continuously open fluid intake port disposed in an end face of said sleeve and submerged within the body of transmission fluid within said housing, said sleeve having a fluid discharge passage communicating with said pumping chamber and extending longitudinally of and in said sleeve in parallel relation with said input shaft, said intake and discharge passages each being spaced closer to the rotational axis of said sleeve than the radial distance between said axis and the outer limits of said pumping chamber, means within said pumping chamber for pumping transmission fluid therethrough and for mechanically coupling said input shaft and pump body for simultaneous rotation when the discharge of fluid from said pumping chamber is restrained, and an adjustable control valve fixed within said stationary housing and communicating with said discharge passage and with the interior of said housing for selectively and solely controlling the discharge of fluid from said pumping chamber back into said reservoir, said sleeve portion being cylindrical in shape and being provided with a discharge opening in the cylindrical side surface thereof communicating with said discharge passage, said control valve comprising a stationary valve casing extending about and rotatably receiving said sleeve portion and being provided with fluid outlet passage means in open communication with said discharge opening, said fluid outlet passage means terminating in a discharge port located radially outwardly from said discharge opening in close proximity to said sleeve portion and with the discharged fluid directed away from said open fluid intake port, and a valve member movably mounted within said valve casing for regulating the flow of transmission fluid through said fluid outlet passage means.

References Cited in the file of this patent
UNITED STATES PATENTS

| | | |
|---|---|---|
| 890,533 | Schmucker | June 9, 1908 |
| 1,529,061 | Gordon | Mar. 10, 1925 |
| 1,748,436 | Arkin | Feb. 25, 1930 |
| 1,935,400 | Junkers | Nov. 14, 1933 |
| 1,990,874 | Millican | Feb. 12, 1935 |
| 2,101,899 | Eddins | Dec. 14, 1937 |
| 2,300,626 | McLaren | Nov. 3, 1942 |
| 2,679,306 | Hartmann | May 25, 1954 |